April 22, 1930.   E. J. WATZL   1,755,618
FEEDING AND CONVEYING APPARATUS
Original Filed Oct. 23, 1925   3 Sheets-Sheet 2
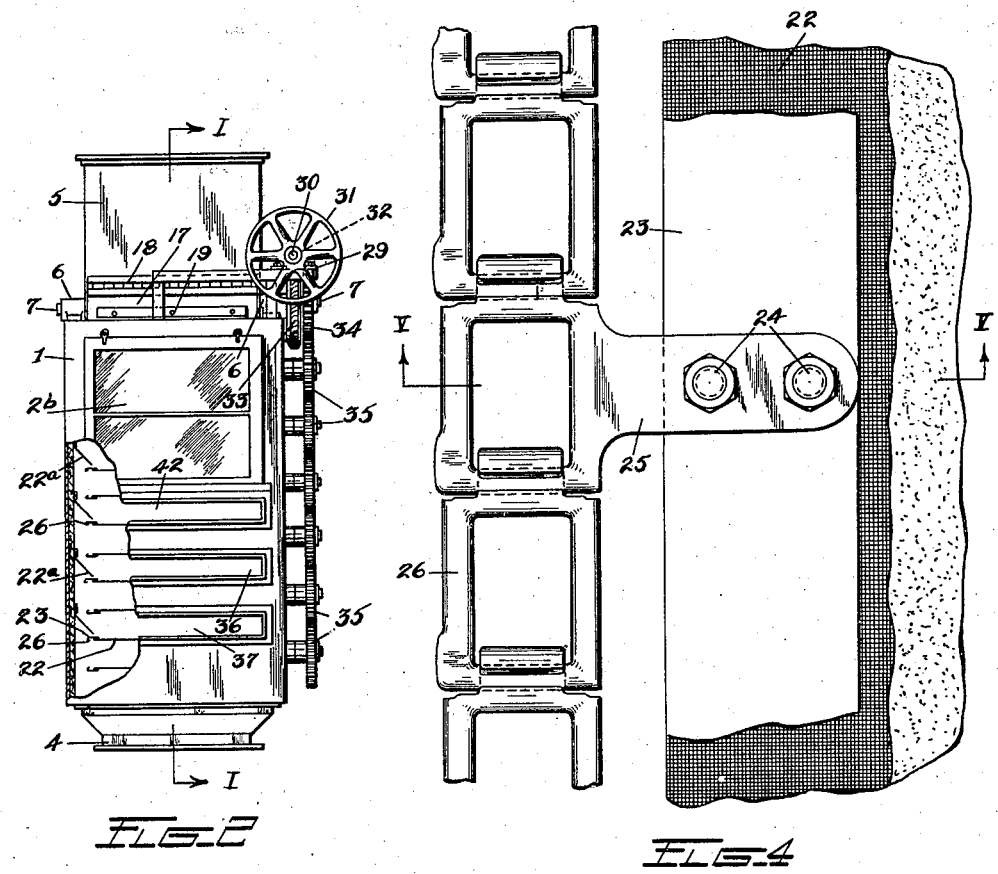
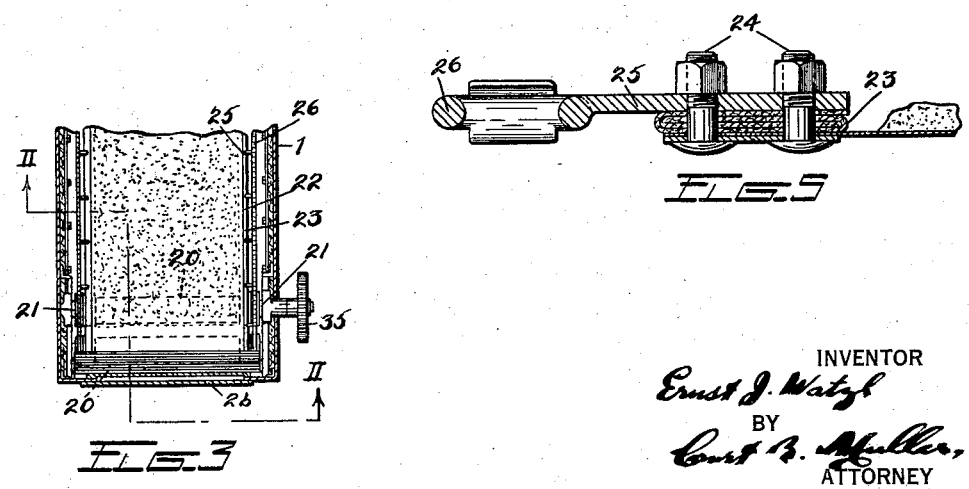

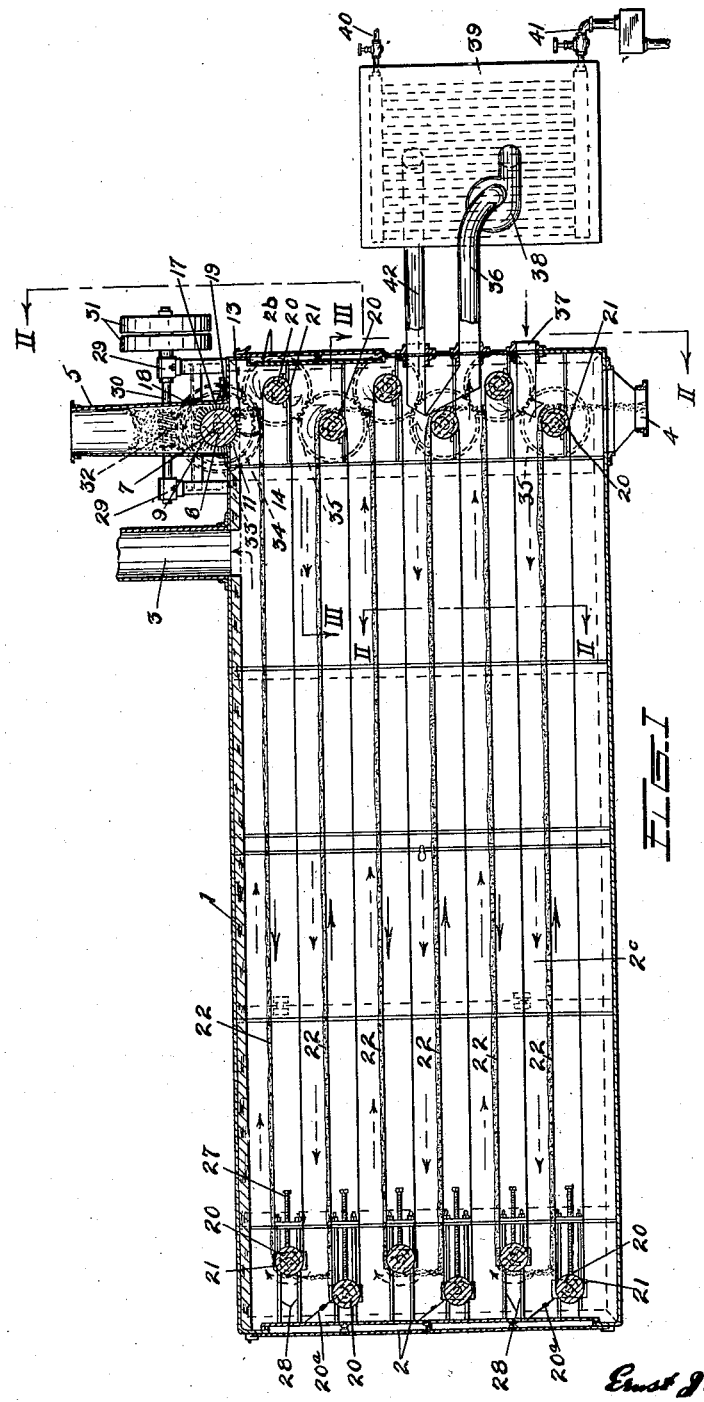

April 22, 1930.   E. J. WATZL   1,755,618
FEEDING AND CONVEYING APPARATUS
Original Filed Oct. 23, 1925   3 Sheets-Sheet 3
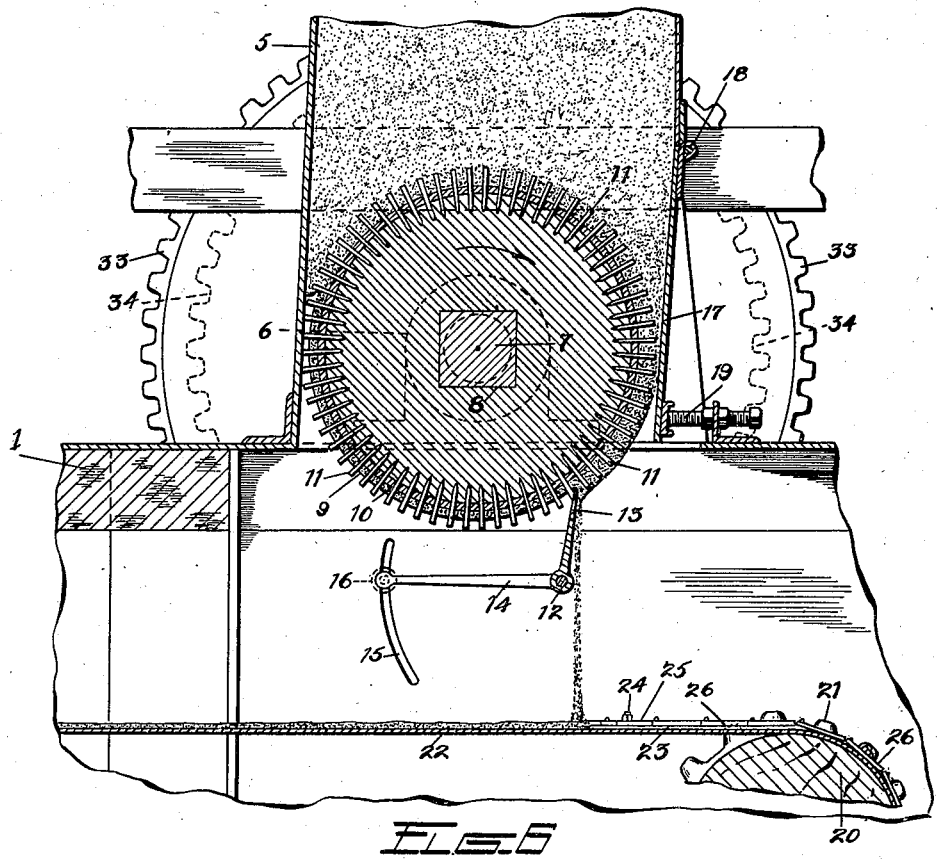
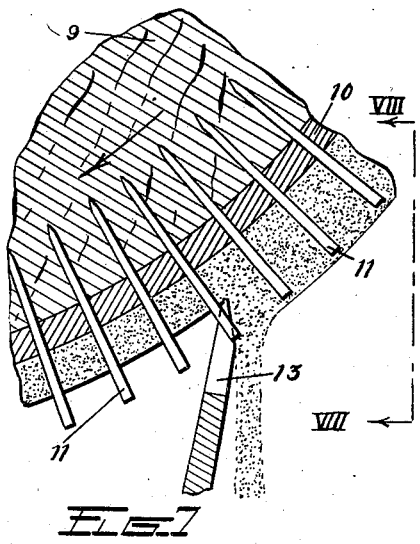
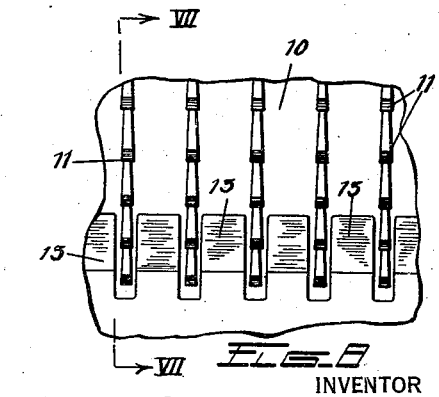
INVENTOR
Ernst J. Watzl
BY
ATTORNEY Patented Apr. 22, 1930

1,755,618

UNITED STATES PATENT OFFICE

ERNST J. WATZL, OF EAST CLEVELAND, OHIO; MARIE C. WATZL TRUSTEE FOR SAID ERNST J. WATZL, MISSING, ASSIGNOR OF ONE-HALF TO HERMAN J. TRENKAMP, OF CLEVELAND HEIGHTS, OHIO

FEEDING AND CONVEYING APPARATUS

Original application filed October 23, 1925, Serial No. 64,330. Divided and this application filed October 19, 1926. Serial No. 142,717.

My invention pertains to an apparatus adapted to accomplish the uniform feeding and progressive drying of a moist material as well as to the method of its use. More particularly, as exemplified by the drawings, the apparatus is adapted uniformly to dry moist granules such as salt crystals.

The primary object of my invention has been to improve upon earlier methods while employing an apparatus sufficiently economical for commercial introduction. Features of my invention are the cooperation at the mouth of an appropriate hopper, of a distributing device and likewise cooperating with the latter a scraping appliance and in turn cooperating with the said appliance a series of superposed endless conveyors, over some of which heated air is directed and over others a cooling air current. Various details of construction may also be novel, but they are hereinafter explained.

I realize that the scope of my invention comprehends many equivalent methods and constructions. The showing of the drawings and the particular description are merely specific exemplifications of a plurality of mechanical embodiments and arrangements.

Adverting to the drawings:

Figure I is a vertical longitudinal section through apparatus embodying my invention.

Figure II is an end elevation on line II—II of Figure I partly in section.

Figure III is a fragmentary plan section on line III—III of Figure I.

Figure IV is an enlargement of a portion of Figure III.

Figure V is a cross-section on line V—V of Figure IV.

Figure VI is an enlarged of distributing mechanism, also shown in the upper right hand corner of Figure I.

Figure VII is a still further enlarged view of a portion of Figure VI.

Figure VIII is a fragmentary elevation on line VIII—VIII of Figure VII, omitting a showing of the salt to be dried.

A suitable insulated chamber 1 provided at one end with double glass windows 2, at its other end with doors $2^b$ and in its side wall with hinged doors $2^c$ all for an obvious purpose. The top of the chamber near one end is provided with an air outlet 3 and the bottom of the same end of the chamber is provided with an outlet 4 through which material, after having been distributed, fed and dried, is to be discharged. Alongside of the air outlet 3 and toward the near end of the chamber is a hopper 5 communicating with the chamber and adapted to receive the moist material which is to be treated during passage through my apparatus.

Distributing mechanism

Appropriately mounted in bearings 6 at the top of the chamber 1, so as to extend across the somewhat larger lower end of the hopper 5, is a shaft 7 carrying a squared section 8 on which is fixed a wooden drum 9. The drum 9 is shown as cylindrical in form with its periphery covered by a metallic cylinder 10. A plurality of spikes 11 are driven radially through the cylinder 10 and into the drum, as shown in Figures VI and VII, and preferably are arranged as a series of circumferential rows, the rows being disposed in substantially parallel radial planes, as shown in Figure VIII. The spikes 11 project corresponding distances beyond the periphery of the metallic cylinder and in fact a distance to be determined by the relative sizes of the drum and lower end of the hopper and the character of the material which is to be distributed through the hopper. It should be understood that the material to be dried is moist enough to have the tendency to pack, and, during the rotation of the drum in the direction indicated by the arrow in Figure VI, will be sufficiently compressed between the surface of the drum and the approached wall of the hopper so that it will adhere to the drum as a layer, held together because of the embedding of the spikes and of a thickness determined by the closed permissible distance between the surface of the drum and the wall of the hopper according to the extent of projection of the spikes. Adjustable about a rod 12 interiorly of the chamber and below the drum are a plurality of upstanding scraping fingers 13 each adapted to project between a pair of rows of spikes 11, as shown in Figures VI to VIII. Together the fingers 13 constitute a kind of comb adapted to scrape a varying thickness from the layer of the material being carried around on the drum. The amount of material which the scraping fingers 13 will remove for gravitational fall is readily controlled by a rocking adjustment of the rod 12 effected by means of a lever 14 having its other end movable in a guide 15 and adapted to be fixed in any chosen position by means of a set screw 16. One section 17 of the lower end of the hopper 5 is made adjustable toward and away from the drum, being pivoted at 18 and controllable as to position by means of the actuating screw 19 in a manner which will be readily understood upon scrutiny of these parts as shown in Figure VI. The purpose of the distributing mechanism, just described, is to control the supply of material to be treated so that it will be deposited as a substantially uniform layer upon a traveling apron as one unit of conveying mechanism to be next described.

Conveying mechanism

As exemplified in the drawings, material scraped from the distributing drum will be caused to follow a zigzag course back and forth along the longitudinal dimension of the chamber 1. The conveying mechanism consists of six superposed endless conveyors, each comprising a pair of drums 20 mounted at the same elevation crosswise of the chamber and near opposite ends thereof respectively. At each end of the drums 20, sprockets 21 are mounted and surrounding each pair of drums, which comprises an individual conveying unit, is an endless apron 22, shown composed of wire cloth. At regular intervals along both borders of the apron 22 I place a fold of compressible material 23 through which, as well as through the apron 22, are passed a pair of bolts 24 for securing the edges of the cloth to arms 25 projecting inwardly from two sprocket chains 26, as shown in Figures IV and V. The chains 26 are to travel each around the pair of sprockets at corresponding ends of a companion pair of drums 20. The tautness of the apron 22 of each conveying unit is readily controlled by set screws 27, which may be actuated to move the six drums 20, which are at the left end of the chamber, along suitable guideways 28. The take-up provision, just described, cooperates with the duplex chain drive along each edge of the aprons to hold them substantially flat as is desirable for efficient performance of one principle of my invention. It will be observed that each conveying unit has one end projecting beyond an end of an adjacent conveying unit, that adjacent conveying units travel in reversed directions according to the indicating arrow in Figure I and that the progressive delivery or gravitational discharge end of each conveying unit is set back with reference to the receiving end of an apron next below. In this manner the material to be treated is permitted gravitationally to fall from one apron to the one next below upon which it is to travel in the opposite direction lengthwise of the chamber.

Driving mechanism

Mounted at the top of the chamber in suitable bearings 29, at one side of the hopper is a shaft 30 on one extremity of which are fast and loose pulleys 31. The shaft 30 is formed with a worm 32, which drives a worm wheel 33, mounted on the shaft 7 on which latter is also fixed a gear 34, which is in mesh with one of a series of six enmeshed gears 35, which are mounted on the near extremities of the six shafts of the drums 20. By this means adjacent pairs of the drums 20 are rotated in opposite directions and the three alternately located drums are rotated in the same direction, thereby causing the uppermost apron surface to travel toward the farther end of the chamber and the lowermost effective apron surface to travel in the opposite direction to the discharge opening 4. The conveyed material will be caused gravitationally to fall into the next lower conveyor at alternately opposite ends, as illustrated in Figure I.

Drying agency

In order to effect the drying of the conveyed material means for supplying heated air is employed, such heated air being designed to circulate along a zigzag course of travel over the four upper conveyors as suggested by the dotted arrows between different conveyors. I consider it desirable and believe it likely to be novel to provide in the one chamber, not only means for drying, by the use of heated air, but also means for cooling. If the heat be absorbed from dried salt crystals their tendency to cake will be counteracted. Having the objects just stated in mind, I provide an exhaust duct 36 communicating with one end of the chamber above the second lowest conveyor which will act to circulate fresh cooling air through the inlet 37 over the lower conveyor toward the opposite end of the chamber and thence back over the second lowest conveyor into the duct 36 to the exhaust fan 38 which also forces it through a heating chamber 39 provided with an inlet 40 and an outlet 41 for the heating elements. The heated air is conducted from the chamber 39 through a pipe 42 adapted to discharge over the third lowest of the conveyors. It may be observed that the four upper conveyors carry material to be subjected to heated air which is exhausted through the pipe 3, whereas the two lower conveyors carry material which is to be cooled in transit preparatory to discharge through the outlet 4. Baffles 20ª extend diagonally from the drums 20 and baffles 22ª along the aprons 22 to prevent the air currents following other than the zigzag course desired.

This application constitutes subject matter divided from my copending application filed October 23, 1925, Serial No. 64,330.

I claim:

1. In apparatus of the class described, the combination of a hopper, a drum projecting into and also somewhat below said hopper for carrying a layer of moist material therefrom through its discharge end and two independently adjustable devices cooperating with said drum for controlling the measure of discharge of material into said chamber one of said devices comprising a movable section of the hopper wall and the other device comprising a finger pivotally mounted below the hopper and adapted to be swung toward or away from said drum.

2. In apparatus of the class described, the combination of a hopper, a drum for continuously carrying a layer of moist material in said hopper toward its discharge end and two pivotally adjustable devices adapted to transscribed opposed arcs and cooperating to control the measure of discharge of material from one side of said drum, one of said devices determining the depth of the layer adhering to said drum and the other device determining the depth of said layer to be dislodged.

3. In apparatus of the class described, the combination of an upright hopper, a drum for continuously carrying a layer of moist material in said hopper toward its lower discharge end, said drum carrying circumferential rows of separated radially projecting spikes, pivotally mounted scraping fingers extending between adjacent rows of said projections at the bottom of said drums for controlling the measure of discharge of material from said drum and an adjustable hopper wall section opposed to the downwardly traveling side of said drum and means for simultaneously controlling the position of said fingers.

4. In apparatus of the class described, the combination of a chamber, a hopper above and having its lower discharge end communicating with said chamber, a cylindrical drum rotatably mounted across said hopper for continuously carrying moist material in said hopper as a layer toward its discharge end, said drum carrying projections, a scraping finger located in said chamber and mounted for adjustable movement toward and away from said drum and between said projections for controlling the measure of discharge of material from said drum, pivotally hung hopper section located above and just ahead of said finger with reference to the direction of discharge of material from said hopper for controlling the depth of the layer of material carried by said drum toward said scraping finger and means for adjustably fixing the position of said hopper section.

Signed by me, this 7th day of July, 1926.
ERNST J. WATZL.